(12) United States Patent
Xiong et al.

(10) Patent No.: US 9,749,329 B2
(45) Date of Patent: Aug. 29, 2017

(54) NETWORK CONNECTION MANAGING DEVICE, SYSTEM AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Kai Xiong, Shenzhen (CN); Xin Lu, Shenzhen (CN); Xin-Hua Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 453 days.

(21) Appl. No.: 14/294,155

(22) Filed: Jun. 3, 2014

(65) Prior Publication Data

US 2014/0365646 A1    Dec. 11, 2014

(30) Foreign Application Priority Data

Jun. 5, 2013  (CN) .......................... 2013 1 0222345

(51) Int. Cl.
*H04L 29/06* (2006.01)
*H04L 12/24* (2006.01)
*H04L 12/28* (2006.01)

(52) U.S. Cl.
CPC ........ *H04L 63/101* (2013.01); *H04L 41/0806* (2013.01); *H04L 41/0886* (2013.01); *H04L 12/2834* (2013.01)

(58) Field of Classification Search
None
See application file for complete search history.

(56) References Cited

U.S. PATENT DOCUMENTS

| 2006/0274774 | A1* | 12/2006 | Srinivasan | H04L 41/0809 370/420 |
| 2007/0250614 | A1* | 10/2007 | Szabo | H04L 12/00 709/223 |
| 2007/0286215 | A1* | 12/2007 | Morris | H04L 63/102 370/401 |
| 2008/0051031 | A1* | 2/2008 | Itoh | H04L 12/2856 455/41.2 |
| 2008/0220740 | A1* | 9/2008 | Shatzkamer | H04L 63/101 455/411 |
| 2011/0289229 | A1* | 11/2011 | Subramaniam | H04L 41/0806 709/228 |
| 2012/0036557 | A1* | 2/2012 | Li | H04L 63/061 726/3 |

(Continued)

*Primary Examiner* — Natisha Cox
(74) *Attorney, Agent, or Firm* — Steven Reiss

(57) ABSTRACT

The present disclosure provides a device and a method for managing network connection. The device is used to connect a number of external devices to a network, and stores a plurality of pieces of network configuration information. The method includes detecting whether one or more external devices requests to connect to the network via the device; and determining the configuration information corresponding to each external device, configuring the allowed external devices and connecting the configured external devices to the network according to the determined network configuration information. A network connection managing system is further provided.

15 Claims, 2 Drawing Sheets

(56) References Cited

U.S. PATENT DOCUMENTS

2013/0167196 A1* 6/2013 Spencer .................. H04W 8/22
              726/3
2013/0265910 A1* 10/2013 Hillen ................. H04L 41/0806
              370/255

* cited by examiner

NETWORK CONNECTION MANAGING DEVICE, SYSTEM AND METHOD

FIELD

The present disclosure relates to network connection management, and particularly, to a device, a system and a method for managing network connection.

BACKGROUND

When connecting an electronic device to a network, network configuration information is often needed to be set in the electronic device manually.

BRIEF DESCRIPTION OF THE DRAWING

Implementations of the present technology will now be described, by way of example only, with reference to the attached figures, wherein.

DETAILED DESCRIPTION

Figure 1:
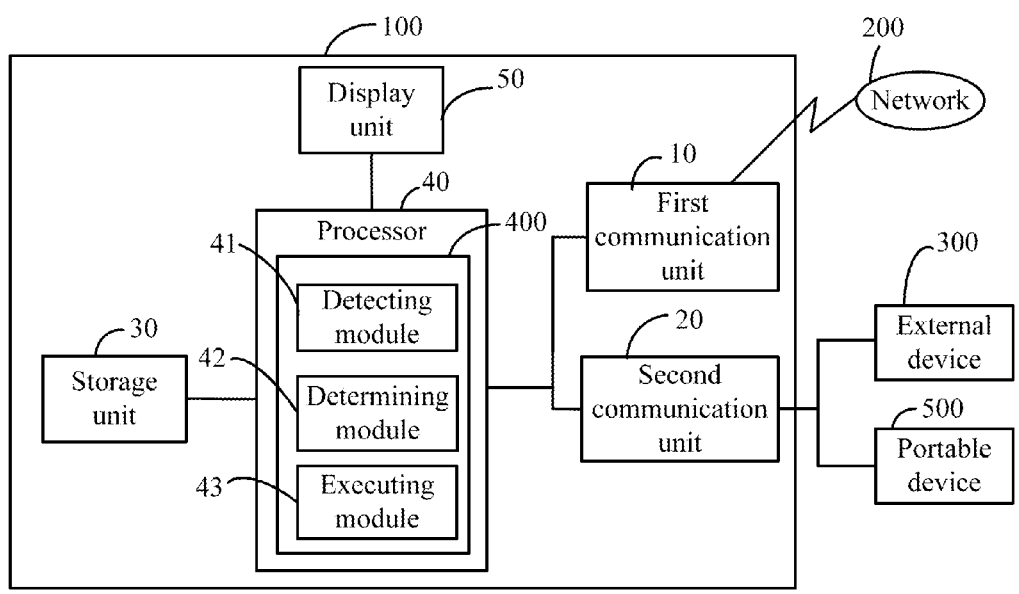
FIG. 1 is a block diagram of a network connection managing device, in accordance with an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein, However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

FIG. 1 illustrates an exemplary embodiment of a network connection managing device 100. The network connection managing device 100 can include a first communication unit 10, a second communication unit 20, a storage unit 30, a processor 40, and a display unit 50.

The first communication unit 10 is used to connect the network connection managing device 100 to a network 200, such as Internet. The second communication unit 20 is used to connect the network connection managing device 100 to one or more external devices 300. Each of the external devices 300 includes a unique identifier. The one or more external devices 300 can be connected to the network 200 via the network connection managing device 100. In this embodiment, the second communication unit 20 can be a wired communication unit or a wireless communication unit. The one or more external devices 300 can be mobile phones, televisions, or computers.

The storage unit 30 stores a plurality of pieces of network configuration information. Each network configuration information corresponds to one type of the one or more external devices 300 and is used to configure the corresponding type of the one or more need to be consistent external devices 300 to enable the corresponding type of the external devices 300 to connect to the network 200 via the network connection managing device 100. Each piece of the network configuration information can include network configuration parameters and network authentication information. The network configuration parameters can include internet protocol (IP) address, media access control (MAC) address, or a name of the network 200, for example. The network authentication information can include network passwords.

A network connection managing system 400 is applied in the network connection managing device 100. The network connection managing system 400 includes a number of modules, which are a collection of software instructions executed by the processor 40. The network connection managing system 400 can include a detecting module 41, a determining module 42, and an executing module 43. The storage unit 30 can be a hard disk, a compact disk, or a flash memory. The processor 40 can be a central processing unit, a digital signal processor, or a single chip.

The detecting module 41 detects whether the one or more external devices 300 request to connect to the network 200 via the network connection managing device 100 or not. In this embodiment, the detecting module 41 determines that one or more external devices 300 request to connect to the network 200 when the detecting module 41 detects that the one or more external devices 300 are connected to the network connection managing device 100 via the second communication unit 20. In an alternative embodiment, the detecting module 41 determines that the one or more external devices 300 request to connect to the network 200 via the network connection managing device 100 when the detecting module 41 receives connection requests from the one or more external devices 300.

If the detecting module 41 detects that the one or more external devices 300 request to connect to the network 200 via the network connection managing device 100, the determining module 42 obtains the unique identifier of each external device 300 requesting to connect to the network 200 and determines whether the unique identifier of the one or more external devices 300 are stored in a blacklist. In this embodiment, the blacklist is stored in the storage unit 30, the blacklist records the unique identifiers of external devices 300 which are forbidden to connect to the network.

If the determining module 42 determines that the unique identifier of the one or more external devices 300 are recorded in the blacklist, the executing module 43 generates a warning signal to prompt the user that the one or more external devices 300 are forbidden to connect to the network 200, and prevents the one or more external devices 300 whose unique identifier are recorded in the blacklist from connecting to the network 200.

If the determining module 42 determines that the unique identifier of the one or more external devices 300 are not recorded in the blacklist, the determining module 42 further determines whether the one or more external devices 300 are allowed by the user to connect to the network 200 in response to a command input by a user. In this embodiment, the display unit 50 can be a touch screen, and the determining module 42 displays the unique identifier of the external devices 300 requesting to connect to the network on the touch screen, and receives the command input by the user via the touch screen. The network connection managing device 100 further can include a number of keys to allow the user to input the command. In another embodiment, the determining module 42 further can display the unique identifier of the external devices 300 requesting to connect to the network 200 on a portable device 500 communicated with the network connection managing device 100, and further receives the command input by the user via the portable device 500.

If the determining module 42 determines that the user inputs a command to allow the one or more external devices 300 to connect to the network 200, the executing module 43 determines one of the pieces of network configuration information corresponding to each external device 300 which is allowed to connect to the network 200, and configures each of the allowed external devices 300 according to the determined network configuration information and then connects the configured one or more external devices 300 to the network 200 according to the determined network configuration information. In detail, the executing module 43 configures the external devices 300 allowed to connect to the network 200, according to the network configuration parameters included in the determined network configuration information, and authenticates the external devices 300 and connects the external devices 300 to the network 200 according to the network authentication information included in the determined network configuration information.

If the determining module 42 determines that the user inputs a command to forbid the one or more external devices 300 from connecting to the network 200, the executing module 43 adds the unique identifier of each external device 300, which is not allowed to connect to the network 200 by the user, to the blacklist stored in the storage unit 30.

In an alternative embodiment, the determining module 42 may directly determine whether the one or more external devices 300 are allowed by the user to connect to the network 200 in response to the command input by the user, and is not needed to determine whether the unique identifier of the external devices 300 requesting to connect to the network 200 is recorded in the blacklist.

In this embodiment, the blacklist can be edited by the user via an input unit of the network connection managing device 100 or via the portable device 500 communicated with the network connection managing device 100. The blacklist can be edited by deleting one or more unique identifiers of the external devices 300 from the blacklist, or adding one or more unique identifiers of the external devices 300 to the blacklist.

In this embodiment, the executing module 43 further can display the unique identifier of the external devices 300, which have been connected to the network 200, on the display unit 50 or on the portable device 500 communicating with the network connection managing device 100. The executing module 43 can cut off the connection between one or more selected external devices 300 and the network 200 according to the selection of the user.

Figure 2:
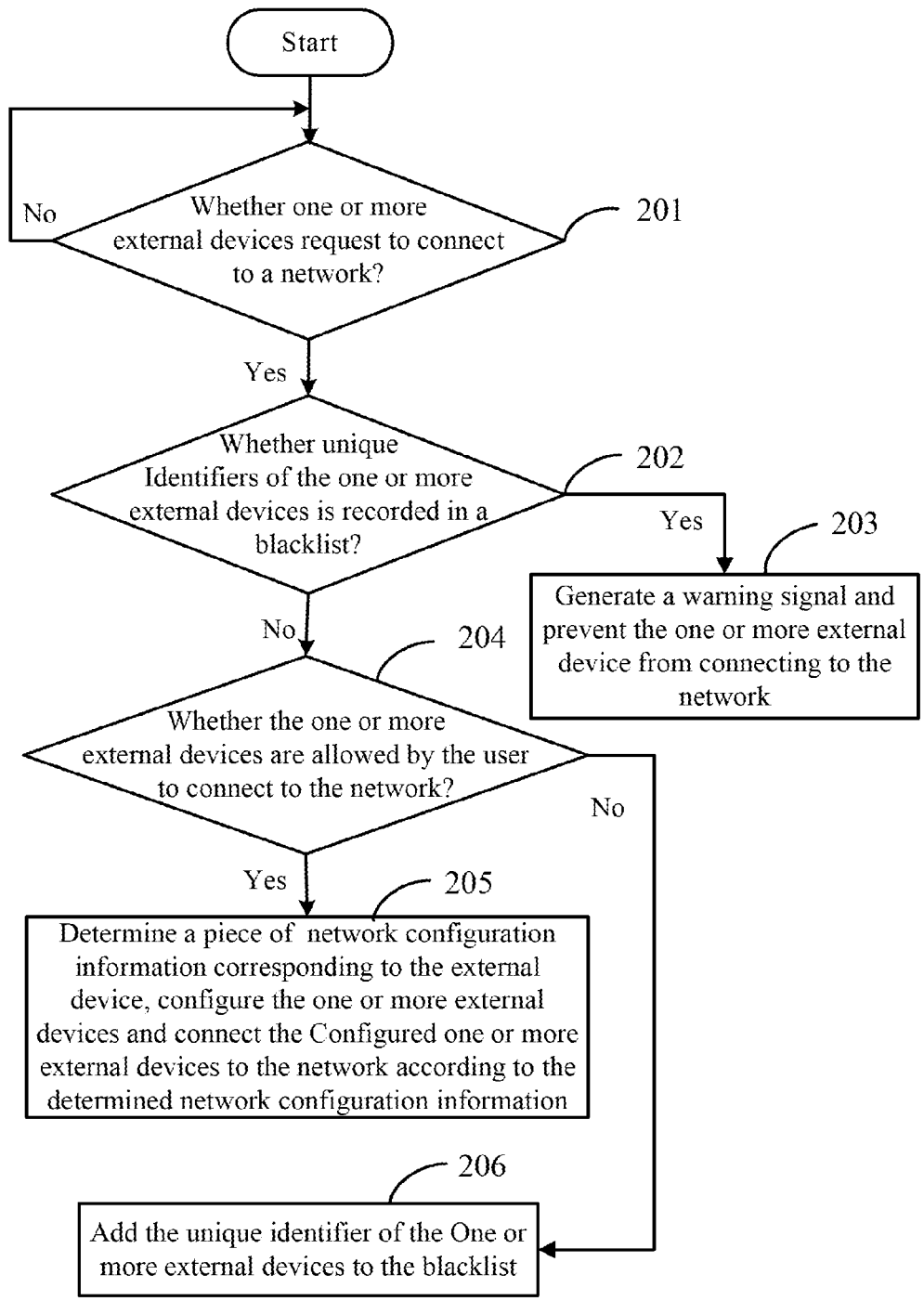
FIG. 2 is a flowchart of a network connection managing method, in accordance with an exemplary embodiment.

FIG. 2 illustrates a flowchart in accordance with an example embodiment. The example network connection managing method is provided by way of example, as there are a variety of ways to carry out the method. The method described below can be carried out using the configurations illustrated in FIG. 1, for example, and various elements of these figures are referenced in explaining example method. Each block shown in FIG. 2 represents one or more processes, methods or subroutines, carried out in the exemplary method. Additionally, the illustrated order of blocks is by example only and the order of the blocks can be changed according to the present disclosure. The exemplary network connection managing method can begin at block 201.

At block 201, a detecting module detects whether the one or more external devices request to connect to a network via a network connection managing device or not. If yes, the procedure goes to block 202, if no, the procedure repeats the block 201.

At block 202, a determining module obtains a unique identifier of each of the one or more external devices and determines whether the unique identifier of the external devices are recorded in a blacklist. If the determining module determines that the unique identifiers of the one or more external devices 300 are recorded in the blacklist, the procedure goes to block 203; if the determining module determines that the unique identifier of the one or more external devices 300 are not recorded in the blacklist, the procedure goes to block 204.

At block 203, an executing module generates a warning signal to prompt the user that the one or more external devices are forbidden to connect to the network, and prevents the external devices whose unique identifier are recorded in the blacklist from connecting to the network.

At block 204, the determining module further determines whether the one or more external devices are allowed to connect to the network in response to a command input by a user. If the determining module determines that the user inputs a command to allow the one or more external devices to connect to the network, the procedure goes to block 205; if the determining module determines that the user inputs a command to forbid the one or more external devices to connect to the network, the procedure goes to block 206.

At block 205, the executing module determines one of the pieces of network configuration information corresponding to each external device which is allowed to connect to the network, and configures each of the allowed external devices 300 according to the network configuration information and then connects the configured one or more external devices 300 to the network 200 according to the determined network configuration information.

At block 206, the executing module adds the unique identifier of the one or more external devices, which are not allowed to connect to the network by the user, to the blacklist stored in the storage unit and prevents the external device from connecting to the network.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A network connection managing device configured to connect one or more external devices to a network, comprising:
   a first communication unit configured to connect the network connection managing device with the network;
   a second communication unit configured to connect the network connection managing device with the one or more external devices;
   a storage unit configured to store a plurality of pieces of network configuration information, each network configuration information corresponding to one type of the one or more external devices and being used to configure the corresponding type of the one or more need to be consistent external devices to enable the corresponding type of the one or more need to be consistent external devices to connect to the network via the network connection managing device;
a processor; and
a network connection managing system comprising a plurality of modules which are a collection of instructions executed by the processor, the modules comprising:
 a detecting module configured to detect whether the one or more external devices request to connect to the network via the network connection managing device or not; and
 an executing module, when the detecting module determines that the one or more external devices request to connect to the network, the executing module determining one of the pieces of network configuration information corresponding to each external device requesting to connect to the network, the network configuration information comprising network configuration parameters and network authentication information, the executing module configuring each of the one or more external devices according to the network configuration parameters of the determined network configuration information and authenticating the configured one or more external devices and connecting the configured one or more external devices to the network according to the network authentication information of the determined network configuration information.

2. The network connection managing device as described in claim 1, wherein the modules further comprises a determining module, when the detecting module determines that the one or more external devices request to connect to the network, the determining module determines whether the one or more external devices are allowed to connect to the network; when the determining module determines that the one or more external devices requesting to connect to the network are allowed to connect to the network, the executing module connects each of the one or more external devices to the network.

3. The network connection managing device as described in claim 2, wherein each external device comprises a unique identifier, the storage unit further stores a blacklist, the blacklist records the unique identifier of the external devices which are forbidden to connect to the network; when the detecting module detects that the one or more external devices request to connect to the network via the network connection managing device, the determining module obtains the unique identifier of each external device and determines whether the unique identifier of the one or more external devices are stored in the blacklist, when the determining module determines that the unique identifier of the one or more external devices are recorded in the blacklist, the determining module determines that the one or more external devices are not allowed to connect to the network, then the executing module generates a warning signal to prompt the user that the one or more external devices are not allowed to connect to the network and prevents the one or more external devices existed in the blacklist from connecting to the network.

4. The network connection managing device as described in claim 3, wherein when the determining module determines that the unique identifier of the one or more external devices are not recorded in the blacklist, the determining module further determines whether the one or more external devices are allowed by the user to connect to the network, in response to the command input by the user; when the user inputs a command to allow the external devices to connect to the network, the executing module determines a network configuration information corresponding to each external device which is allowed to connect to the network, and configures the allowed external devices according to the determined network configuration information and then connects the configured external devices to the network according to the determined network configuration information.

5. The network connection managing device as described in claim 4, further comprising a display unit, wherein the executing module further controls the display unit to display the unique identifier of the one or more external devices requesting to connect to the network, to allow the user to input the commands.

6. The network connection managing device as described in claim 4, wherein the executing module is further configured to display the unique identifier of the one or more external devices requesting to connect to the network on a portable device communicated with the network connection managing device via the second communication unit, to allow the user to input the commands via the portable device.

7. The network connection managing device as described in claim 4, wherein when the user inputs a command to prevent the one or more external devices from connecting to the network, the executing module prevents the one or more external devices connecting to the network and adds the unique identifier of the one or more external devices to the blacklist.

8. A network connection managing system applied in a network connection managing device which is configured to connect one or more external devices to a network, the network connection managing device comprising a storage unit and a processor, the storage unit stored a plurality of pieces of network configuration information, each network configuration information corresponding to one type of the external device, the network connection managing system comprising:
 a plurality of modules which are a collection of instructions executed by the processor, the modules comprising:
  a detecting module configured to detect whether the one or more external devices request to connect to the network via the network connection managing device or not; and
  an executing module, when the detecting module determines that the one or more external devices request to connect to the network, the executing module determining one of the pieces of network configuration information corresponding to each external device requesting to connect to the network, the network configuration information comprising network configuration parameters and network authentication information, the executing module configuring each of the one or more external devices according to the network configuration parameters of the determined network configuration information and authenticating the configured one or more external devices and connecting the configured one or more external devices to the network according to the network authentication information of the determined network configuration information.

9. The network connection managing system as described in claim 8, wherein the modules further comprises a determining module, when the detecting module determines that the one or more external devices request to connect to the network, the determining module determines whether the one or more external devices are allowed to connect to the network; when the determining module determines that the one or more external devices requesting to connect to the network are allowed to connect to the network, the executing module connects each of the one or more external devices to the network.

10. The network connection managing system as described in claim 9, wherein each external device comprises a unique identifier, the storage unit further stores a blacklist, the blacklist records the unique identifier of the external devices which are forbidden to connect to the network; when the detecting module detects that the one or more external devices request to connect to the network via the network connection managing device, the determining module obtains the unique identifier of each external device and determines whether the unique identifier of the one or more external devices are stored in the blacklist, when the determining module determines that the unique identifier of the one or more external devices are recorded in the blacklist, the determining module determines that the one or more external devices are not allowed to connect to the network, then the executing module generates a warning signal to prompt the user that the one or more external devices are not allowed to connect to the network and prevents the one or more external devices existed in the blacklist from connecting to the network.

11. The network connection managing system as described in claim 10, wherein when the determining module determines that the unique identifier of the one or more external devices are not recorded in the blacklist, the determining module further determines whether the one or more external devices are allowed by the user to connect to the network, in response to the command input by the user; when the user inputs a command to allow the external devices to connect to the network, the executing module determines a network configuration information corresponding to each external device which is allowed to connect to the network, and configures the allowed external devices according to the determined network configuration information and then connects the configured external devices to the network according to the determined network configuration information.

12. The network connection managing system as described in claim 8, wherein network connection managing device further comprises a display unit, the executing module further controls the display unit to display the unique identifier of the one or more external devices requesting to connect to the network, to allow the user to input the commands.

13. A network connection managing method applied in a network connection managing device configured to connect one or more external devices to a network, the network connection managing device comprising a storage unit stored a plurality of pieces of network configuration information, each piece of network configuration information corresponding to one type of the external device, each piece of network configuration information comprising network configuration parameters and network authentication information, the method comprising:

detecting whether the one or more external devices request to connect to the network via the network connection managing device or not; and when determining that the one or more external devices request to connect to the network, determining one of the pieces of network configuration information corresponding to each external device requesting to connect to the network, configuring each of the external devices requesting to connect to the network according to the network configuration parameters of the determined network configuration information and authenticating the configured one or more external devices and connecting the configured one or more external devices to the network according to the network authentication information of the determined network configuration information.

14. The network connection managing method as described in claim 13, further comprising:

obtaining an unique identifier of each external device requesting to connect to the network and determining whether the unique identifier of the external devices are recorded in a blacklist stored in the storage unit;

generating a warning signal to prompt the user that the one or more external devices are forbade to connect to the network and preventing the one or more external devices from connecting to the network when the unique identifier of the one or more external devices are recorded in the blacklist.

15. The network connection managing method as described in claim 14, further comprising:

determining whether the one or more external devices are allowed to connect to the network in response to commands input by a user when the unique identifier of the one or more external devices are not recorded in the blacklist;

when determining that the user inputs commands to allow the one or more external devices to connect to the network, determining network configuration information corresponding to each external device which is allowed to connect to the network, and configuring each external device according to the determined network configuration information and connecting the configured external devices to the network according to the determined network configuration information;

when determining that the user inputs commands to forbid the one or more external devices to connect to the network, adding the unique identifier of the one or more external devices to the blacklist stored in the storage unit and preventing the one or more external devices from connecting to the network.

\* \* \* \* \*